(12) United States Patent
Ohkawa et al.

(10) Patent No.: US 9,252,602 B2
(45) Date of Patent: Feb. 2, 2016

(54) ELECTRIC STORAGE CELL CONTROL CIRCUIT

(75) Inventors: Keiichiro Ohkawa, Hitachinaka (JP); Youhei Kawahara, Tokyo (JP); Ryouhei Nakao, Tokyo (JP)

(73) Assignee: HITACHI AUTOMOTIVE SYSTEMS, LTD., Tokyo (JP)

( * ) Notice: Subject to any disclaimer, the term of this patent is extended or adjusted under 35 U.S.C. 154(b) by 243 days.

(21) Appl. No.: 14/119,388

(22) PCT Filed: May 23, 2011

(86) PCT No.: PCT/JP2011/061767
§ 371 (c)(1),
(2), (4) Date: Mar. 28, 2014

(87) PCT Pub. No.: WO2012/160638
PCT Pub. Date: Nov. 29, 2012

(65) Prior Publication Data
US 2014/0217982 A1    Aug. 7, 2014

(51) Int. Cl.
*H02J 7/00* (2006.01)
*H01M 10/44* (2006.01)
*B60L 11/18* (2006.01)
*H01M 10/42* (2006.01)

(52) U.S. Cl.
CPC ........... *H02J 7/0014* (2013.01); *B60L 11/1866* (2013.01); *H01M 10/441* (2013.01); *H02J 7/0016* (2013.01); *B60L 2240/545* (2013.01); *B60L 2240/547* (2013.01); *B60L 2240/549* (2013.01); *H01M 2010/4271* (2013.01); *Y02T 10/7055* (2013.01)

(58) Field of Classification Search
CPC ....................................................... H02J 7/0016
USPC ........................................................... 320/118
See application file for complete search history.

(56) References Cited

U.S. PATENT DOCUMENTS

| 6,064,178 A * | 5/2000 | Miller | H02J 7/0016 320/117 |
|---|---|---|---|
| 6,538,414 B1 * | 3/2003 | Tsuruga | H02J 7/0016 320/119 |
| 2012/0139491 A1 * | 6/2012 | Eberhard | H02J 7/0016 320/118 |

FOREIGN PATENT DOCUMENTS

| JP | 2004-031012 A | 1/2004 |
|---|---|---|
| JP | 2008-193871 A | 8/2008 |
| JP | 2011-019329 A | 1/2011 |

* cited by examiner

*Primary Examiner* — Suresh Memula
(74) *Attorney, Agent, or Firm* — Volpe and Koenig, P.C.

(57) ABSTRACT

To satisfactorily carry out balancing even when balancing control is suspended. It is selected according to a condition which of battery cell information (old state information) by the last balancing stored in a storage device and battery cell information (new state information) acquired during a start of this time is used, and the balancing control is performed.

11 Claims, 10 Drawing Sheets

ELECTRIC STORAGE CELL CONTROL CIRCUIT

TECHNICAL FIELD

The present invention relates to a battery control circuit mounted on a power supply device including electricity storing means such as a lithium secondary battery, a nickel-metal hydride battery, a lead-acid battery, or an electric double layer capacitor.

BACKGROUND ART

In an electric storage device mounted on an electric vehicle (EV), a plug-in hybrid vehicle (PHEV), or a hybrid vehicle (HEV), in general, a plurality of electric storage cells are connected in series to configure an electric storage unit. When there is an individual difference of an electric storage cell such as fluctuation in a capacity or self-discharge fluctuation among the electric storage cells, fluctuation occurs in states of charge (SOC) of the electric storage cells included in the electric storage device. When this fluctuation occurs, charge control is performed with reference to the electric storage cell having the highest SOC among the plurality of electric storage cells and discharge control is performed with reference to the electric storage cell having the lowest SOC. Therefore, energy usable by the electric storage unit decreases. When it is anticipated that a range of use of an SOC becomes wide as in the PHEV or the EV, in a state in which the SOC is high or low, deterioration of the electric storage cell tends to progress. Therefore, it is necessary to take measures for, when the SOC is too high, reducing the SOC and, when the SOC is too low, preventing a further decrease in the SOC. Accordingly, in order to eliminate fluctuation in SOCs among a plurality of electric storage cells that could occur when the electric storage cells are connected in series, there is proposed a method in which a balancing circuit configured by a bypass resistor and a bypass switch connected to the electric storage cells in parallel and electric storage cell controller for monitoring states of the electric storage cells are mounted and the electric storage cell controller controls the bypass switch of the balancing circuit on the basis of a fluctuation amount of a voltage. This method is a balancing method for forcibly discharging an electric storage cell having a high voltage and performing equalization of the voltage.

JP-A-2004-31012 describes that, only when an average value of charging capacities of all cells of a assembly battery is within a range in which a gradient $|\Delta Vo/\Delta SOC|$ in a charging capacity SOC-open circuit voltage Vo characteristic of the cell is equal to or larger than a predetermined value, capacity adjustment conditions for the cells of the assembly battery are determined and capacity adjustment is performed according to the conditions and that, when the capacity adjustment is suspended, remaining information of the capacity adjustment is stored in storing means and, when the capacity adjustment can be performed, the capacity remaining information is read out from the storing means and the capacity adjustment is resumed.

CITATION LIST

Patent Literature

PTL 1: JP-A-2004-31012

SUMMARY OF INVENTION

Technical Problem

In the case of electric storage cells used in a wide range of SOCs such as electric storage cells mounted on a PHEV or an EV, when the electric storage cells are left untouched in a state in which SOC fluctuation is present among the electric storage cells in a high SOC state, there is a concern about deterioration fluctuation. On the other hand, because of a battery characteristic of an OCV (Open Circuit Voltage)-SOC curve, it is desirable to acquire battery information in a high SOC region and continuously perform balancing to the end. That is, when the balancing is suspended, the balancing is continued and resumed from the suspended state. The balancing is not started anew at every start. However, when the continuous balancing is always carried from the suspended state, the fluctuation is sometimes worsened because of a change in a battery state, a bypass resistor error, and the like. There is also a problem in that, even in the case of a battery state (high SOC, etc.) in which there is more concern about the deterioration fluctuation, capacity adjustment conditions cannot be acquired anew and a chance for performing satisfactory balancing is missed.

Solution to Problem

In the invention, when balancing is carried out using information concerning electric storage cells, it is selected which of information during balancing suspension of the last time (old state information) stored in a storage device and information concerning the electric storage cells acquired during a start of this time (new state information) is used. The balancing is executed on the basis of the selected information.

That is, an electric storage cell control circuit according to the invention includes a controller including a storage device, the controller performing state monitoring and balancing control for a plurality of electric storage cells connected in series. The controller means stores, in the storage device, information for balancing control calculated on the basis of states of the plurality of electric storage cells and performs the balancing control on the basis of the information stored in the storage device. When the balancing control is suspended, the controller stores information during the suspension concerning balancing in the storage device and, in starting the balancing control after the suspension, acquires the latest information concerning states of the plurality of electric storage cells, selects, on the basis of a predetermined condition, whether the balancing control is resumed on the basis of the information during the suspension stored in the storage device or balancing is started anew on the basis of the latest information, and, when the balancing is started anew, stores, in the storage device, information for the balancing control calculated on the basis of the acquired latest information.

In a more specific form, a plurality of electric storage cell controller are provided to correspond to a plurality of electric storage cell groups connected in series and configuring an electric storage unit. The respective electric storage cell controller perform monitoring of states and balancing control of respective electric storage cells belonging to the electric storage cell groups corresponding to the electric storage cell controller. States of the electric storage cells to be monitored include a voltage, an SOC, and a temperature. The electric storage unit controller controls the plurality of electric storage cell controller on the basis of information received from the plurality of electric storage cell controller. The electric storage unit controller sends, to the electric storage cell controller of the electric storage cell group in which the electric storage cell having a charging state higher than a predetermined charging state is present, information for the balancing control calculated on the basis of the information received from the electric storage cell controller. The electric storage cell controller includes a storage device, stores the received information in the storage device, and performs the balancing control on the basis of the information stored in the storage device.

When the balancing control is suspended, the electric storage cell controller stores information during the suspension concerning the balancing in the storage device. Thereafter, when the balancing control is carried out again, the electric storage unit controller acquires the latest information concerning states of the respective electric storage cells belonging to the respective electric storage cell groups from the respective electric storage cell controller. The electric storage unit controller determines whether the balancing control is resumed on the basis of the information during the suspension stored in the storage device or balancing is started anew on the basis of the latest state. When balancing is started anew, the electric storage unit controller sends information for the balancing control calculated anew on the basis of the acquired latest information to the electric storage cell controller corresponding to the information. The electric storage cell controller stores the received information in the storage device. In both the cases, the electric storage cell controller executes the balancing control on the basis of the information stored in the storage device. Conditions for determining, based on which of the new information and the old information the balancing is performed, are stored in the electric storage unit controller.

Advantageous Effect of Invention

According to the invention, it is possible to satisfactorily carry out balancing.

Objects, components, and effects other than those explained above are made apparent by the following explanation of an embodiment.

DESCRIPTION OF EMBODIMENTS

An embodiment of the invention is explained below on the basis of the drawings. In the embodiment explained below, an example is explained in which the invention is applied to an electric storage device configuring a power supply for a plug-in hybrid vehicle (PHEV). However, the invention can also be applied to electric storage cell control circuits of electric storage devices configuring power supplies of passenger cars such as a hybrid vehicle (HEV) and an electric vehicle (EV) and industrial vehicles such as a hybrid railroad vehicle.

In the embodiment explained below, an example is explained in which a lithium ion battery is applied to an electric storage cell configuring an electric storage unit. As the electric storage cell, besides the lithium ion battery, a nickel-metal hydride battery, a lead-acid battery, an electric double layer capacitor, a hybrid capacitor, and the like can also be used. Note that, in the embodiment explained below, a assembly battery corresponds to an electric storage unit, a battery cell corresponds to an electric storage cell, a battery cell group corresponds to an electric storage cell group, battery cell controller corresponds to electric storage cell controller, and assembly battery controller corresponds to electric storage unit controller. The battery cell controller and the assembly battery controller are realized as an integrated circuit on a circuit board. Combined means of the battery cell controller and the assembly battery controller corresponds to controller.

Figure 1:
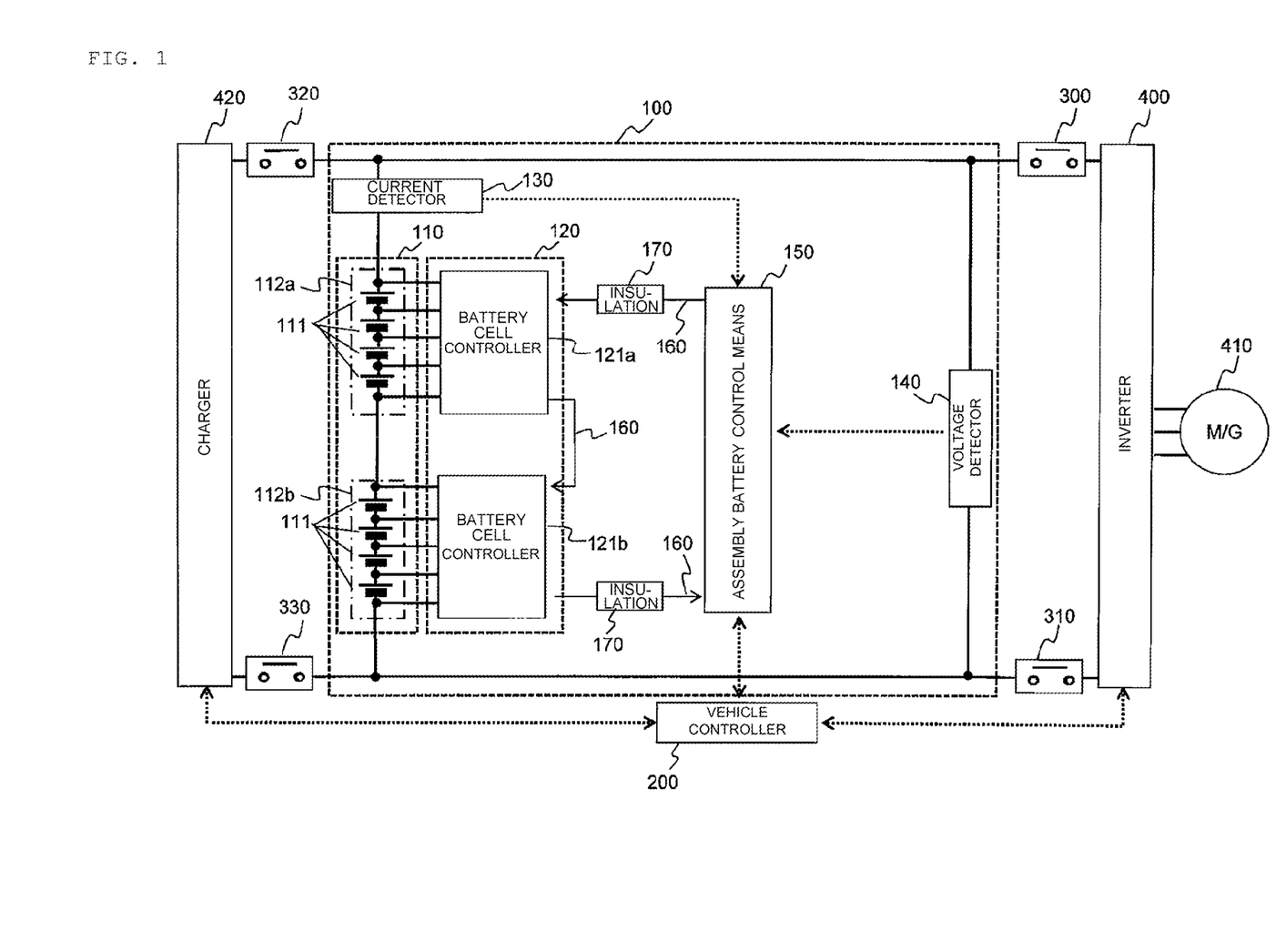
FIG. 1 is a block diagram showing a configuration example of an electric storage device of a PHEV according to the invention.

A configuration example of an electric storage device of a PHEV in an embodiment of the invention is shown in FIG. 1.

First, the configuration of an electric storage device 100 is explained. The electric storage device 100 includes a assembly battery 110 configured by a plurality of battery cells 111, battery cell manager 120 for monitoring states of the battery cells 111, current detector 130 for detecting an electric current flowing to the electric storage device 100, voltage detector 140 for detecting a total voltage of the assembly battery 110, and assembly battery control means 150 for performing control of the assembly battery 110. Battery voltages and temperatures of the battery cell 111 transmitted from the battery cell manager 120, a current value flowing to the electric storage device 100 transmitted from the current detector 130, and a total voltage value of the assembly battery 110 transmitted from the voltage detector 140 are input to the assembly battery control means 150. The assembly battery control means 150 performs state detection and the like for the assembly battery 110 on the basis of the input information. A result of processing performed by the assembly battery control means 150 is transmitted to the battery cell manager 120 and vehicle controller 200.

The vehicle controller 200 performs, on the basis of the information of the assembly battery controller 150, control of an inverter 400 connected to the electric storage device 100 via relays 300 and 310 and a charger 420 connected to the electric storage device 100 via relays 320 and 330. During vehicle traveling, the electric storage device 100 is connected to the inverter 400 and drives a motor generator 410 on the basis of energy stored by the assembly battery 110. During charging, the electric storage device 100 is connected to the charger 420 and charged by power supply from a power supply for home use or an electricity station.

The assembly battery 110 is configured by electrically connecting in series a plurality of battery cells 111 (lithium ion batteries) capable of accumulating and discharging electric energy (charging and discharging direct-current power). An example is explained in which one battery cell 111 has an output voltage of 3.0 to 4.2 V (an average output voltage: 3.6

Figure 3:
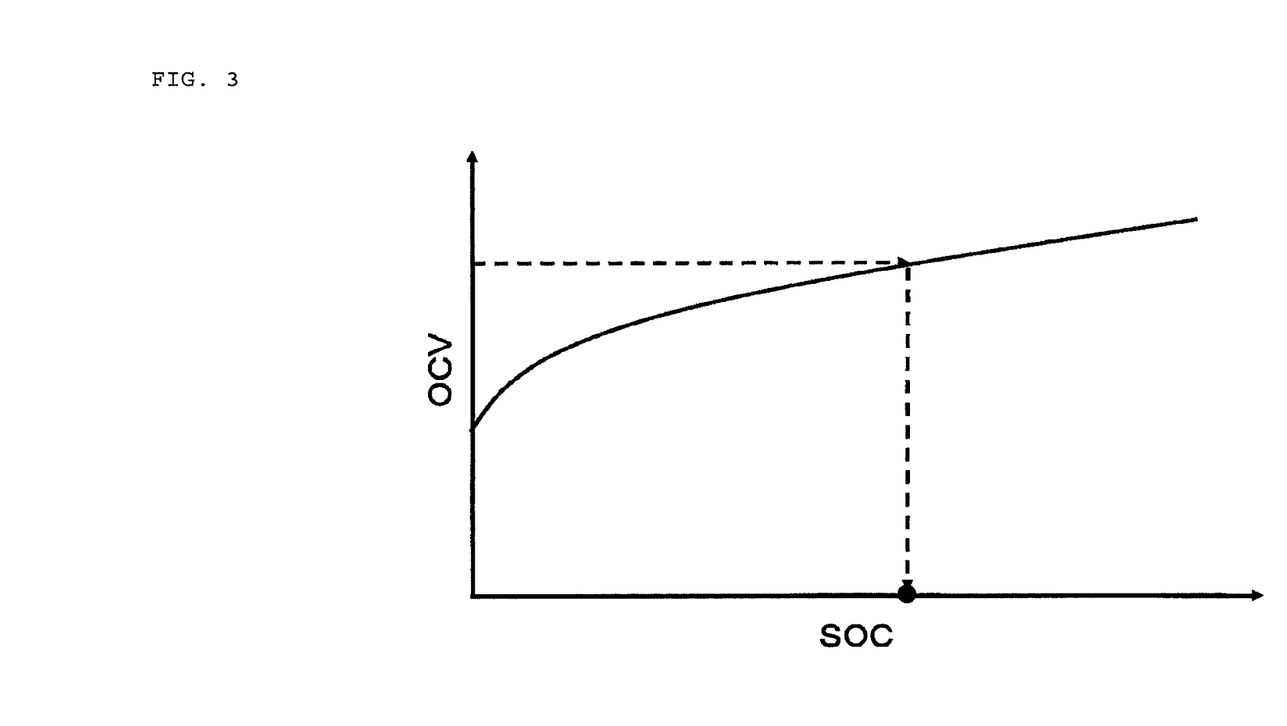
FIG. 3 is a characteristic chart representing a correlation between an SOC and an OCV.

V) and there is a correlation shown in FIG. 3 between an open circuit voltage (OCV) and an SOC of the battery cell 111. However, the battery cell 111 may be battery cells of voltage specifications other than this voltage specification.

The battery cells 111 configuring the assembly battery 110 are grouped into a predetermined unit number when management and control of states are performed. The grouped battery cells 111 are electrically connected in series and configure battery cell groups 112a and 112b. In some case, the predetermined unit number is a unit number for equal division such as one, four, or six and, in other cases, the predetermined unit number is a unit number for composite division such as a combination of four and six. The battery cell group 112a on a high potential side and the battery cell group 112b on a low potential side are electrically connected in series via a service disconnector 180 for maintenance and inspection in which a switch and a fuse are connected in series.

The battery cell manager 120 for monitoring states of the battery cells 111 configuring the assembly battery 110 is configured by a plurality of battery cell controller 121a and 121b. One battery cell controller 121a or 121b is allocated to the battery cell group 112a or 112b grouped as explained above. The battery cell controller 121a and 121b receive electric power from the battery cell groups 112a and 112b, to which the battery cell controller 121a and 121b are allocated, and operate. The battery cell controller 121a and 121b monitor and control states of the battery cells 111 configuring the battery cell groups 112a and 112b.

In this embodiment, to simplify explanation, it is assumed that the assembly battery 110 includes eight battery cells 111 in total, four battery cells 111 are electrically connected in series to configure two battery cell groups 112a and 112b, and the battery cell groups are electrically connected in series via the service disconnector 180. The battery cell controller 121a and 121b for monitoring states of the battery cells 111 are respectively set in the battery cell groups 112a and 112b.

A plurality of signals including measurement values of battery voltages and temperatures of the battery cells 111 output from the battery cell manager 120, a diagnosis result concerning whether the battery cells 111 are overcharged or over-discharged, an abnormality signal output when a communication error or the like occurs in the battery cell manager 120, a current value from the current detector 130, a total voltage value of the assembly battery 110 output from the voltage detector 140, and a signal output from the vehicle controller 200, which is a host control device, are input to the assembly battery controller 150. The assembly battery controller 150 executes, on the basis of the input information, internal resistances of the battery cells 111 stored in advance, and a relation between an SOC and an OCV (FIG. 3), an SOC calculation for the battery cells 111, a calculation for performing balancing control including discharge end condition explained below, a calculation for controlling charging and discharging amounts, and the like. The assembly battery controller 150 outputs results of the calculations and commands based on the calculation results to the battery cell manager 120 and the vehicle controller 200.

The assembly battery controller 150 and the battery cell manager 120 perform transmission and reception of signals using the signal communication device 160 via an insulation element 170 such as a photocoupler. The insulation element 170 is provided because operation power supplies are different between the assembly battery controller 150 and the battery cell manager 120. That is, the battery cell manager 120 receives electric power from the assembly battery 110 and operates. On the other hand, the assembly battery controller 150 uses a battery for vehicle-mounted accessories (e.g., 14V-system battery) as a power supply. The insulation element 170 may be mounted on a circuit board configuring the battery cell manager 120 or may be mounted on a circuit board configuring the assembly battery controller 150. Naturally, the battery cell manager 120 and the assembly battery controller 150 may be mounted on one circuit board. Note that it is also possible to omit the insulation element 170 depending on a system configuration.

Communication means for the assembly battery controller 150 and the battery cell controller 121a and 121b in this embodiment is explained. The battery cell controller 121a and 121b are connected in series in decreasing order of the potentials of the battery cell groups 112a and 112b respectively monitored by the battery cell controller 121a and 121b. A signal transmitted by the assembly battery controller 150 is input to the battery cell controller 121a by the signal communication means 160 via the insulation element 170. An output of the battery cell controller 121a and an input of the battery cell controller 121b are also connected by the signal communication device 160. Transmission of a signal is performed between the output and the input. Note that, in this embodiment, the battery cell controller 121a and the battery cell controller 121b is connected not via the insulation element 170. However, the battery cell controller 121a and the battery cell controller 121b may be connected via the insulation element 170. An output of the battery cell controller 121b is transmitted by the signal communication device 160 via the insulation element 170 through an input of the assembly battery controller 150. In this way, the assembly battery controller 150 and the battery cell controller 121a and the battery cell controller 121b are connected by the signal communication device 160 in a loop shape. This loop connection is sometimes called daisy-chain connection, tie-up connection, or chain connection. Note that, in an example explained here, the battery cell controller 121a and the battery cell controller 121b are connected in a loop shape. However, the battery cell controller 121a and the battery cell controller 121b do not always have to be connected in the loop shape. The battery cell controller 121a and the battery cell controller 121b may be connected in any form as long as the assembly battery controller 150 and the battery cell controller 121a and the battery cell controller 121b are connected.

Figure 2:
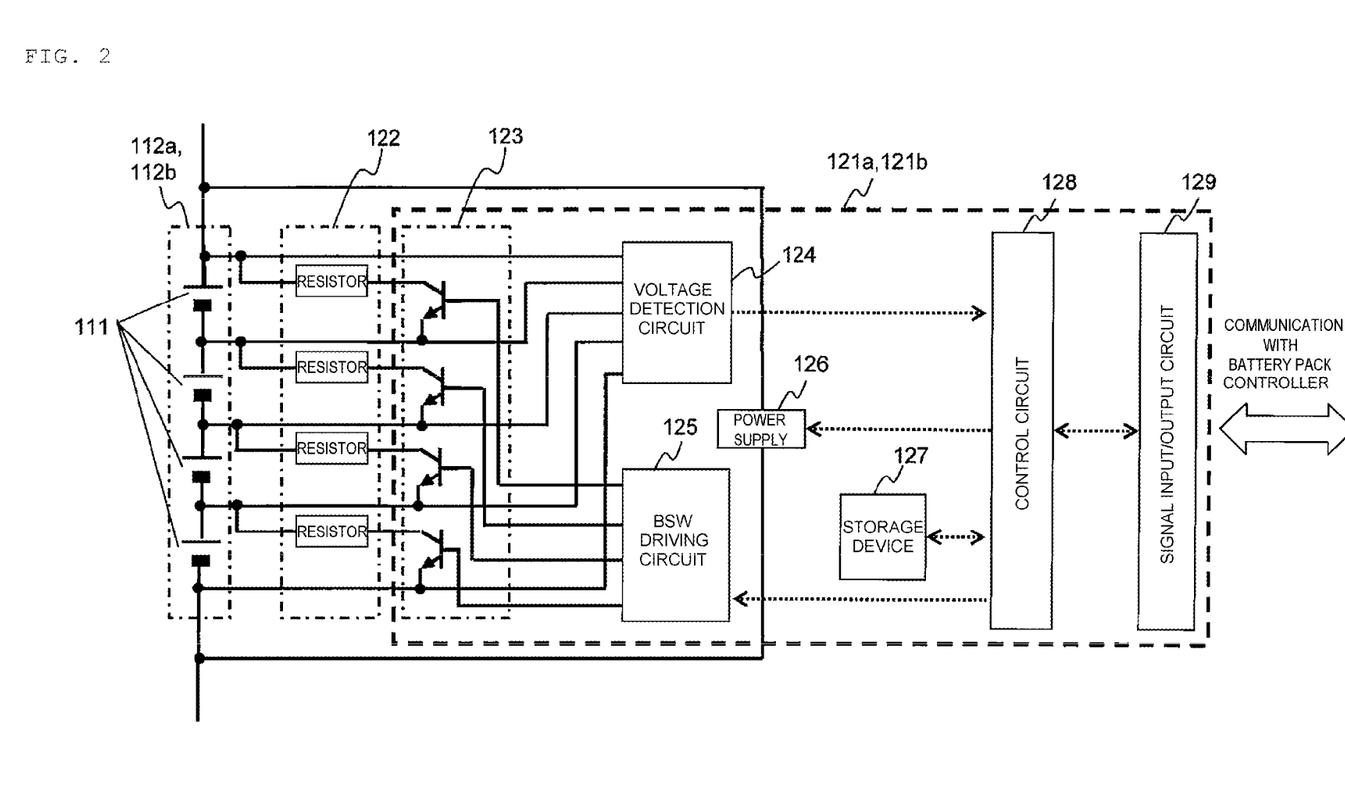
FIG. 2 is a block diagram showing a circuit configuration example of battery cell controller.

A circuit configuration of the battery cell controller 121a and 121b in this embodiment is shown in FIG. 2. The battery cell controller 121a and 121b include a balancing circuit configured by a bypass resistor 122 and a bypass switch 123, a BSW driving circuit 125 configured to drive the bypass switch 123, a voltage detection circuit 124 configured to measure a battery voltage of the battery cells 111 set as management targets, a power supply 126 for causing the battery cell controller 121a and 121b to operate, a control circuit 128 configured to perform control of the battery cell controller 121a and 121b on the basis of information from the assembly battery controller 150, and a signal input/output circuit 129 configured to perform transmission and reception of a signal between the battery cell controller 121a and 121b and the assembly battery controller 150 or battery cell controller 121 adjacent to the battery cell controller 121a and 121b.

Capacities of battery cells measured in advance, information for balancing calculated by the assembly battery controller 150, and the like are stored in a storage device 127 such as an EEPROM. As explained in detail below, discharge times of the battery cells via the bypass resistor 122 necessary until SOC values reach target SOC values are stored. When a balancing operation is suspended before completion, states during balancing suspension, for example, an elapsed time (a discharge time) from a balancing start, a remaining time until balancing completion, a remaining balancing capacity, information concerning whether balancing is completed for each of the battery cells, and a battery temperature during a balancing start are stored in the storage device 127. Note that the configuration in which the storage device 127 is included in the battery cell controller 121a and 121b is explained here. However, for example, a configuration in which the information is stored in a storage device included in the assembly battery controller 150 may be adopted.

The control circuit 128 receives, via the signal input/output circuit 129, a voltage acquisition command and information concerning balancing control transmitted from the assembly battery controller 150 and outputs a battery voltage detected by the voltage detection circuit 124 and information based on the battery voltage to the signal input/output circuit 129. The control circuit 128 performs control of the BSW driving circuit 125 on the basis of the detected battery voltage and the information stored in the storage device 127.

Discharge means of a balancing circuit is explained. The discharge means is means for discharging, using a balancing circuit configured by the bypass resistor 122 and the bypass switch 123, the battery cell 111 having a high SOC among the battery cells 111 configuring battery cell groups 112. That is, the discharge means turns on the bypass switch 123 connected to the discharge target battery cell 111 in parallel and forcibly discharges the battery cell 111 using the bypass resistor 122, and reduces the SOC to an SOC set as a target (a target SOC). The target SOC is a predetermined SOC that is set, when any one of the plurality of battery cells 111 configuring the assembly battery 110 is overcharged or when fluctuation exceeding a tolerance occurs in SOCs of the battery cells 111 configuring the battery cell groups 112 as explained above, in order to eliminate the overcharge or the fluctuation. Details of the target SOC are explained below. Note that a discharge end condition explained in this embodiment is not limited to a condition explained below.

The discharge end condition is determined on the basis of a result of calculation of time necessary for discharge of the battery cells 111. Time necessary for securing a predetermined discharge amount is calculated and, when the calculated time elapses, discharge is ended. Therefore, time measuring means such as a timer is set in the battery cell controller 121 in order to determine whether the calculated time has elapsed. Note that, in the following explanation of calculation formulas for determining the discharge end condition, the number of battery cells 111, eight, is replaced with N, the number of battery cell groups 112, two, is replaced with M, and the number of battery cells 111 configuring the battery cell groups 112, four, is replaced with L (=N/M).

First, SOCs are estimated on the basis of a correlation between an SOC and an OCV from OCV measurement results of all the battery cells 111 in a assembly battery no-load state. Differences ΔSOCs between the SOCs of the battery cells 111 and target SOCs are calculated according to the following formula (1):

[Math. 1]

$$\Delta SOC_{1X} = SOC_{1X} - \text{target } SOC_1 \quad (1)$$
$$\Delta SOC_{2X} = SOC_{2X} - \text{target } SOC_2$$
$$\Delta SOC_{3X} = SOC_{3X} - \text{target } SOC_3$$
$$\ldots$$
$$\Delta SOC_{MX} = SOC_{MX} - \text{target } SOC_M$$
$$(X = 1, 2, 3, \ldots, L)$$

Time t necessary for adjustment is calculated from the calculated ΔSOCs according to the following formula (2):

[Math. 2]

$$t_{1X} = (\Delta SOC_{1X} \times Q\max_{1X})/I_B \quad (2)$$
$$t_{2X} = (\Delta SOC_{2X} \times Q\max_{2X})/I_B$$
$$t_{3X} = (\Delta SOC_{3X} \times Q\max_{3X})/I_B$$
$$\ldots$$
$$T_{MX} = (\Delta SOC_{MX} \times Q\max_{MX})/I_B$$
$$(X = 1, 2, 3, \ldots, L)$$

In the formula, Qmax represents a full charging capacity [Ah] of the battery cell 111, IB represents a bypass current [A] flowing to the bypass resistor, and X represents a number of the battery cell 111 configuring the battery cell group. The adjustment time t is set as a discharge end condition for the respective battery cells. The discharge target battery cell 111 is discharged on the basis of a result of the formula (2). When the time necessary for securing the predetermined discharge amount elapses, the discharge is ended. Note that it is also possible that a balancing capacity ΔSOC×Qmax[Ah] of the battery cells 111 is calculated instead of the adjustment time t, the discharge amount [Ah] is subtracted from the balancing capacity ΔSOC×Qmax [Ah] for each unit time, and a balancing capacity equal to or smaller than 0[Ah] is set as the discharge end condition.

Figure 4:
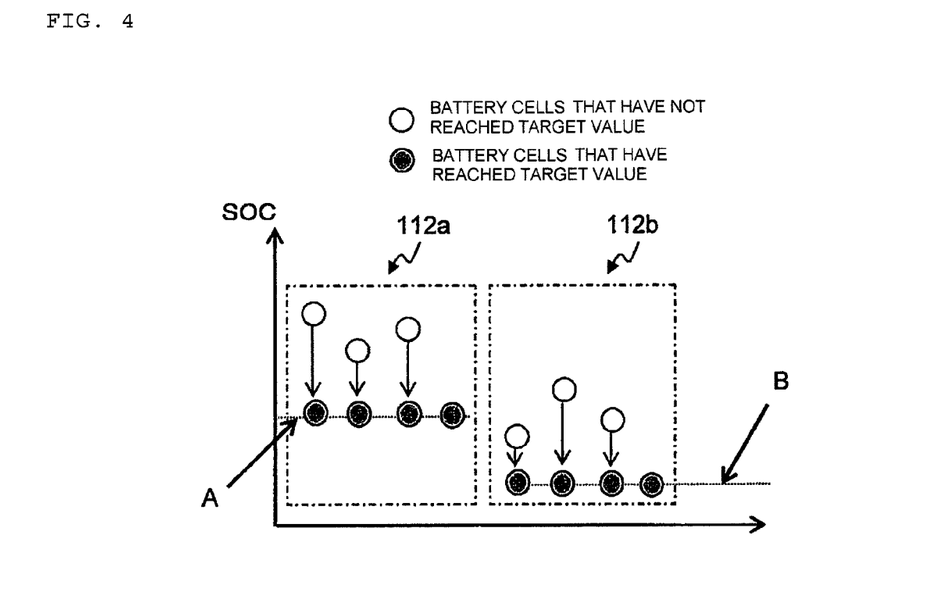
FIG. 4 is a diagram showing an example of a change of the SOC by discharge means.

An example of a change of an SOC by the discharge means is explained according to FIG. 4. In the example shown in the figure, the discharge means discharges the battery cell 111 having a high SOC using a balancing circuit such that all battery voltages of the battery cells 111 configuring the battery cell groups 112 coincide with a target value set for each of the battery cell groups 112. In the case of the example shown in the figure, a target SOC of the battery cell group 112a is A and a target SOC of the battery cell group 112b is B. Therefore, when an SOC of the discharge target battery cell 111 among the battery cells 111 configuring the battery cell groups 112 decreases as shown in FIG. 4 and SOCs of all the battery cells 111 configuring the battery cell groups 112 coincide with the target value, the discharge means ends the discharge. Note that, when target SOCs set in all the battery cell groups 112 are adjusted to the lowest target SOC, i.e., in the case of FIG. 4, B and balancing is performed, SOCs of all the battery cells 111 configuring the assembly battery 110 can be matched to B.

Figure 5:
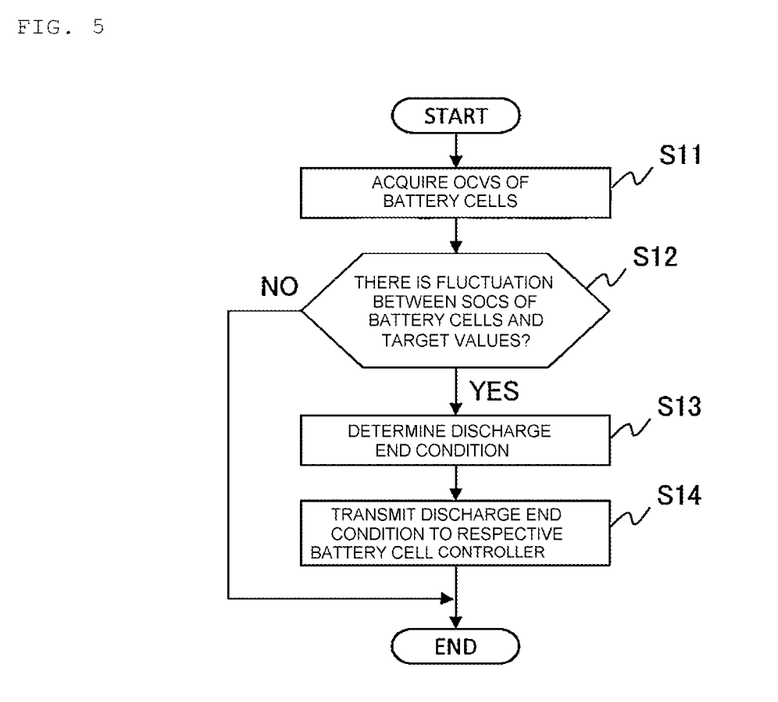
FIG. 5 is a flowchart for explaining an operation example of assembly battery controller.

Subsequently, a flow of an operation for determining a discharge end condition for the assembly battery controller 150 in this embodiment is explained on the basis of a flowchart of FIG. 5. FIG. 5 is an operation flowchart of the assembly battery controller 150 during traveling or during charging of a vehicle.

First, in step 11, the assembly battery controller 150 acquires voltages (OCVs) at no-load time of all the battery cells 111 or at time that can be regarded as the no-load time because an electric current is feeble. The OCVs are converted into SOCs using the relation shown in FIG. 3. Subsequently, the assembly battery controller 150 proceeds to step 12 and determines whether there is fluctuation between the SOCs of the battery cells 111 configuring the battery cell groups 112 and the target SOCs. If it is determined that there is fluctuation, the assembly battery controller 150 proceeds to step 13.

In step 13, the assembly battery controller 150 determines a discharge end condition of the discharge means including the balancing circuit configured by the bypass resistor 122 and the bypass switch 123. In step 14, the assembly battery controller 150 transmits the discharge end condition to the battery cell controller 121.

Figure 6:
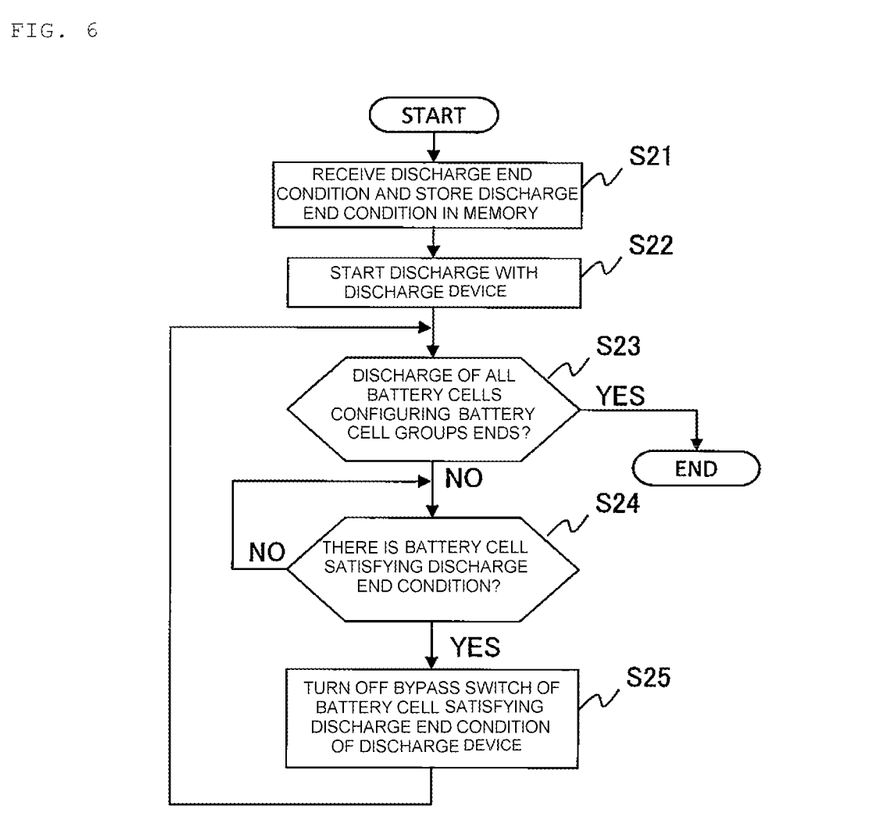
FIG. 6 is a flowchart for explaining an operation example of the battery cell controller.

A flow of the operation of the discharge means of the battery cell controller 121 in this embodiment is explained on the basis of a flowchart of FIG. 6. FIG. 6 is a flowchart for explaining the operation of the battery cell controller 121 during traveling or during charging of the vehicle.

First, in step 21, the battery cell controller 121 receives the discharge end condition transmitted from the assembly battery controller 150 and stores the received discharge end condition in the storage device 127. Subsequently, the battery cell controller 121 proceeds to step 22 and starts discharge from the discharge target battery cell 111 using the balancing circuit including the bypass resistor 122 and the bypass switch 123. Note that the discharge does not always need to be continuous and may be intermittently performed using a pulse signal, duty control, or the like. In that case, the adjustment time t or the adjustment discharge amount $\Delta SOC \times Q_{max}$ is determined by integrating only a discharging time and a discharge amount.

In step 23, the battery cell controller 121 determines whether discharge of all the battery cells configuring the battery cell groups 112 ends. When it is determined that the discharge ends, the battery cell controller 121 ends the processing. When it is determined in the determination in step 23 that the discharge of all the battery cells 111 does not end, the battery cell controller 121 proceeds to step 24 and determines whether there is the battery cell 111 that satisfies the discharge end condition. When there is the battery cell 111, the discharge of which ends, the battery cell controller 121 proceeds to step 25 and turns off the bypass switch 123 in order from the battery cell 111, the discharge of which ends. Thereafter, the battery cell controller 121 returns to step 23 and continues the processing until the discharge of all the battery cells 111 configuring the battery cell groups 112 ends.

The above is the explanation of the general balancing control. There is slight fluctuation in battery capacities of the battery cells 111 configuring the assembly battery 110 according to individual differences. If the assembly battery 110 is used and left untouched for a long time in a state in which there is SOC fluctuation in a high SOC region, for example, immediately after charging, the capacity fluctuation further expands because of deterioration of the cells. In this embodiment, the balancing control is carried out in order to prevent the capacity fluctuation expansion due to the deterioration in the high SOC region. For example, in the high SOC region, with reference to a battery cell having the lowest value of an SOC, a battery cell having an SOC higher than the SOC of the battery cell by 0.5% or more is selected as a balancing target battery cell. A discharge amount and a discharge time necessary for matching the SOC of the balancing target battery cell to the lowest SOC are calculated by Formulas (1) and (2). The bypass switch 123 accompanying the corresponding battery cell 111 is turned on for the discharge time determined by the calculation to discharge the battery cell 111 via the bypass resistor 122. In this way, the fluctuation in the battery cell SOCs after balancing is suppressed to 0.5%. When key-off (main switch-off) of the vehicle is performed before completion of the balancing, the balancing is suspended. At that point, halfway information during the balancing suspension, i.e., an elapsed time from a balancing start, remaining discharge times and remaining capacities of the battery cells, and the like are stored in the storage device 127. The assembly battery controller 150 is stopped. When key-on (main switch-on) of the vehicle is performed next time, the balancing halfway information stored during the last suspension is read out from the storage device 127. The balancing is resumed and continued on the basis of the information.

Figure 7:
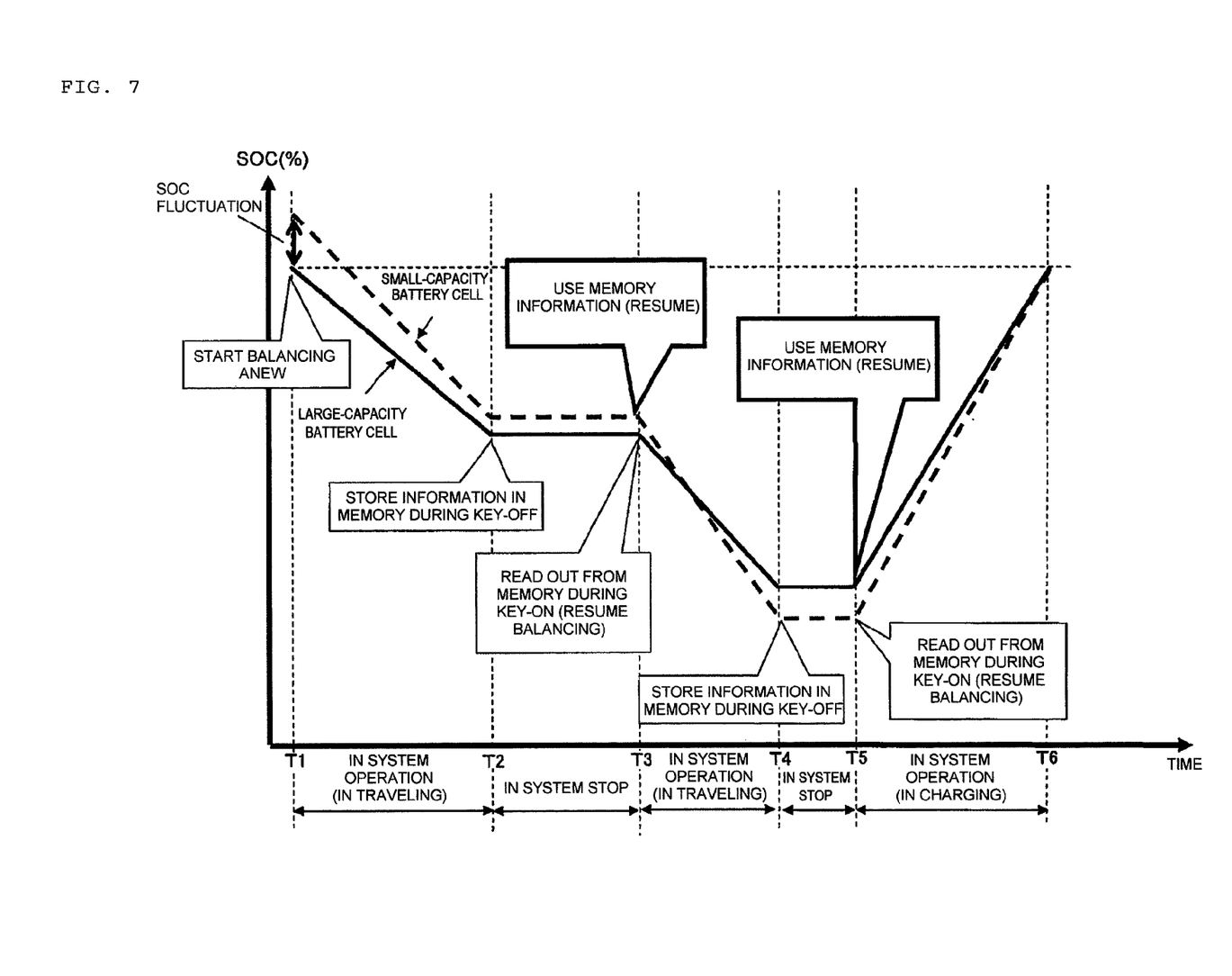
FIG. 7 is an explanatory diagram showing a state of balancing control for resuming, when balancing is suspended, the balancing using information during suspension.

FIG. 7 is an explanatory diagram showing a state of balancing control for resuming, when balancing is suspended, the balancing using information during the suspension. The abscissa indicates time and the ordinate indicates an SOC. In the figure, an SOC change of a large-capacity battery cell based on an individual difference is indicated by a solid line. An SOC change of a small-capacity battery cell is indicated by a broken line. To simplify explanation, it is assumed that the vehicle is traveling and the assembly battery controller 150 (in the figure, described as system) is operating in a section (T1, T2) and a section (T3, T4). It is assumed that the vehicle is being charged and the assembly battery controller 150 is operating in a section (T5, T6). It is assumed that the assembly battery controller 150 is stopped in a section (T2, T3) and a section (T4, T5) among the sections. It is assumed that an initial state at time T1 is a state in which charging ends. The balancing control is executed in time during the operation of the assembly battery controller 150.

As it is seen from an SOC at time T1, since all the battery cells 111 are connected in series and charged with the same charging current, in an initial state after the end of the charging, the SOC is higher in the small-capacity battery cell indicated by the broken line than the large-capacity battery cell indicated by the solid line. Fluctuation indicated by arrows occurs in the SOC. It is undesirable to leave the presence of the fluctuation unattended in a region with such a high SOC because the capacity fluctuation expands because of deterioration of the battery cells. Therefore, balancing is started when the SOC is high, for example, when an average SOC of the plurality of battery cells 111 configuring the battery cell groups 112 is equal to or higher than 75%. It is assumed that balancing is started anew at time T1. In the start of the balancing, as explained above, a discharge amount necessary for adjusting and equalizing SOCs of the battery cells 111, which are obtained by conversion from OCVs measured in a state in which the assembly battery 110 can be regarded as no load, to target values and time necessary for discharging the discharge amount via the bypass resistor 122 are calculated and stored in the storage device 127 (in the figure, described as memory). Thereafter, balancing control is started on the basis of the stored discharge time for each of the battery cells.

When the vehicle stops at time T2 and key-off is performed, the assembly battery controller 150 suspends a balancing operation, causes the storage device 127 to store balancing information at that point, and then stops the operation. The information stored in the storage device 127 includes, for example, an elapsed time (a discharge time) from the balancing start or a remaining adjustment time obtained by subtracting the elapsed time from the discharge time necessary for SOC adjustment calculated for each of the battery cells. When the key-on of the vehicle is performed again and the assembly battery controller 150 operates at time T3, the assembly battery controller 150 reads out the halfway information during the balancing suspension from the storage device 127 and resumes the balancing using the information. When the vehicle stops and key-off of the vehicle is performed again at time T4, the assembly battery controller 150 causes the storage device 127 to store the balancing halfway information during the suspension, i.e., the elapsed time from the balancing start or the remaining time for each of the battery cells and then stops the operation. With the same discharge current, decreasing speed of an SOC is higher in the small-capacity battery cell indicated by the broken line than in the large-capacity battery cell indicated by the solid line. A magnitude relation between the SOCs of the large-capacity battery cell indicated by the solid line and the small-capacity battery cell indicated by the broken line is reversed at time T4 from the magnitude relation at time T1. Further, when the electric storage device 100 is connected to the charger 420 and the assembly battery controller 150 resumes the operation at time T5, the assembly battery controller 150 reads out the balancing halfway information stored at time T4 from the storage device 127 again. The assembly battery controller 150 resumes the balancing from the suspended state using the information. As a result, at time T6 when the charging ends, the SOCs of the battery cells having the different capacities are equalized in the high SOC region and expansion of the capacity fluctuation due to the deterioration of the battery cells is prevented.

Figure 8:
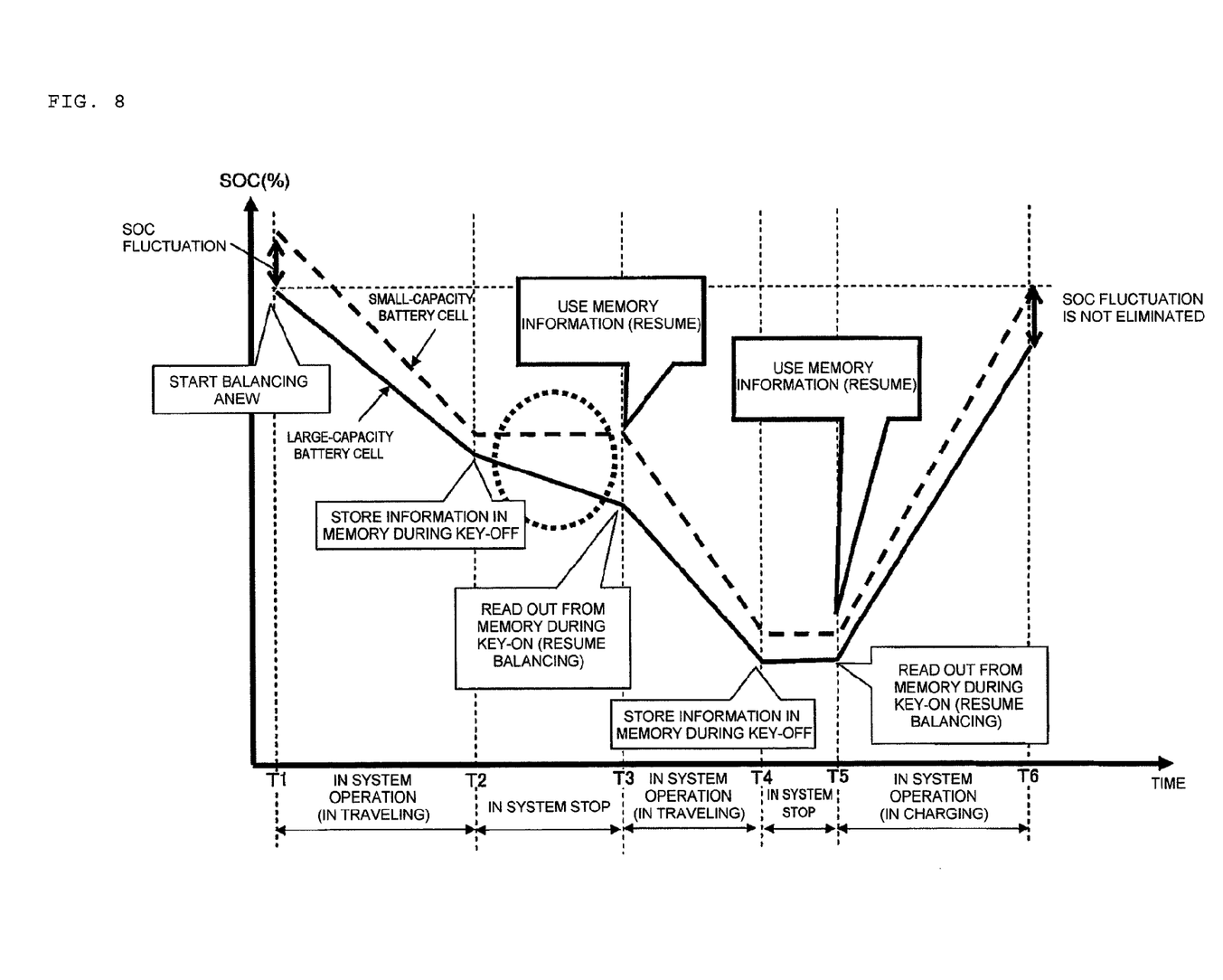
FIG. 8 is an explanatory diagram showing a state of balancing control carried out when a battery state changes in FIG. 7.

An ideal state is shown in FIG. 7. However, if the balancing is always continued and resumed using the balancing halfway information, the fluctuation in the SOCs sometimes worsens because of a change in a battery state or the like. When the batteries are replaced, since the balancing halfway information does not match an actual battery state, this also causes worsening of the fluctuation in the SOCs. For example, as shown in FIG. 8, it is assumed that balancing is started anew in order to eliminate the SOC fluctuation indicated by the arrows present at time T1. Further, as in the case of FIG. 7, it is assumed that, when the key-off of the vehicle is performed at Time T2, T4, or the like, halfway information during balancing suspension is stored in the storage device 127 and, during the key-on at time T3, T5 or the like, the balancing is resumed using the balancing halfway information stored in the storage device 127. A method of taking over the halfway information during the balancing suspension and continuing the balancing is based on the premise that SOCs of the battery cells do not change between the balancing suspension time and the resumption time. If a battery state changes because of some cause during the stop of the assembly battery controller 150 at time T2 to T3, SOCs of the battery cells at the time when the balancing is resumed at time T3 are different from SOCs at the time when the balancing is suspended at time T2. Therefore, as indicated by a state at time T5, the SOC fluctuation among the battery cells in the high SOC state cannot be eliminated.

Therefore, in this embodiment, a determining unit configured to determine which information of old state information of the battery cells by balancing during a battery start of the last time stored in the storage device 127 and new state information of the battery cells obtained by a battery start of this time is used is provided in the assembly battery controller 150. When balancing is started in a battery start of this time, it is determined by the determining unit whether the balancing is performed on the basis of the old state information or performed on the basis of the new state information. During the battery start of this time, the assembly battery controller 150 acquires the present SOCs of the battery cells 111 from the battery cell controller 121 again and calculates, on the basis of the SOCs acquired again, a discharge time via the bypass resistor 122 of the battery cells 111 necessary for SOC adjustment. The determining unit collates the SOCs with a stored determination condition. When it is estimated that the SOCs of the batteries deviate from the SOCs during the last balancing suspension by a predetermined amount or more, the determining unit overwrites information concerning a discharge end condition calculated from the present SOCs in the storage device 127. Otherwise, the determining unit resumes the balancing using the halfway information during the balancing suspension stored in the storage device 127. In this way, the present state information of the battery cells 111 or the old state information of the battery cells 111 during the last balancing suspension is selected and the balancing control is carried out. Consequently, even if a change in a battery state or the like occurs during the stop of the assembly battery controller 150, it is possible to satisfactorily perform equalization of SOCs.

Figure 9:
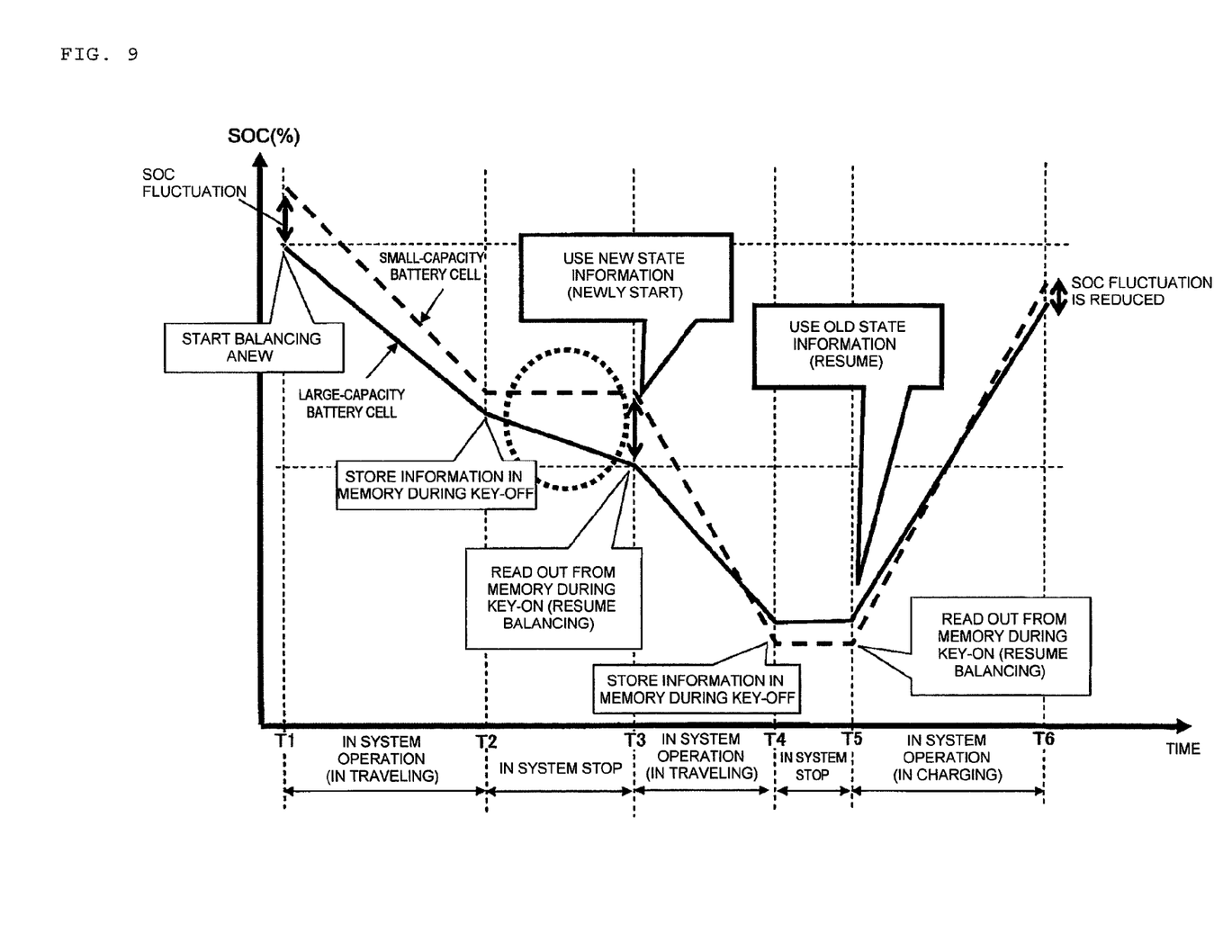
FIG. 9 is an explanatory diagram showing a state of balancing control according to an embodiment of the invention.
Figure 10:
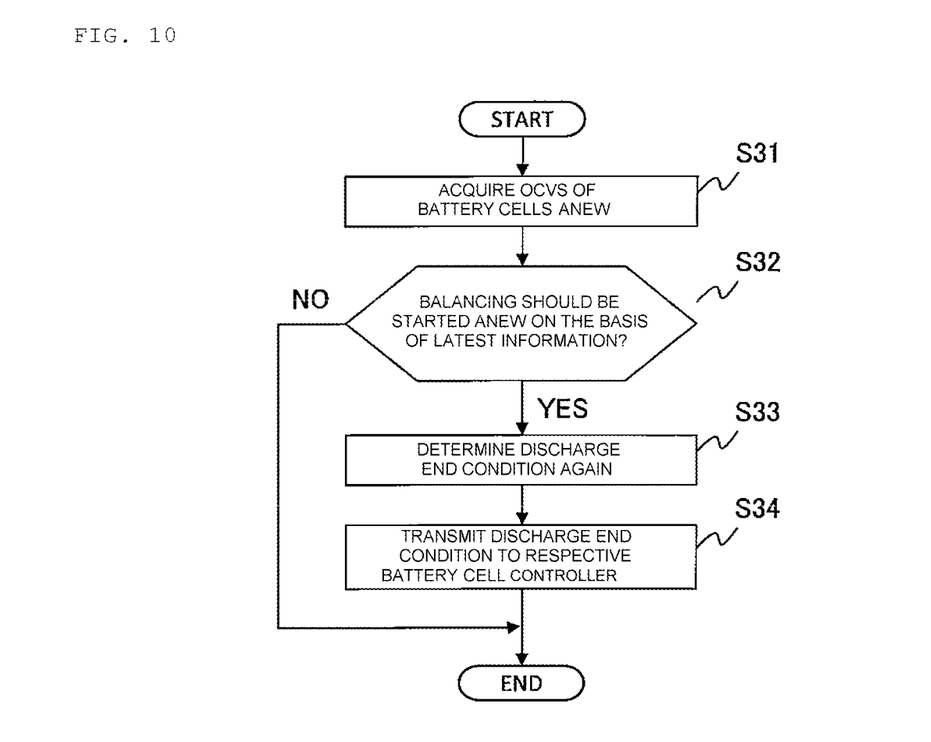
FIG. 10 is a flowchart for explaining an example of processing executed before the balancing control is started during a battery start.

FIG. 9 is an explanatory diagram showing an example of balancing control carried out when it is determined which of the old state information of the battery cells 111 by the balancing during the battery start of the last time stored in the storage device 127 and the new state information of the battery cells 111 obtained during the battery start of this time is used. FIG. 10 is a flowchart showing an example of processing executed before the balancing control is started during a battery start.

The processing is the same as the processing shown in FIG. 7 when balancing is started anew at time T1 and, when key-off of the vehicle is performed at time T2, the assembly battery controller 150 suspends a balancing operation, stores balancing halfway information at that point in the storage device 127, and then stops the operation. Subsequently, when the key-on of the vehicle is performed at time T3 and the assembly battery controller 150 operates, first, the assembly battery controller 150 executes processing shown in FIG. 10. That is, in step 31, the assembly battery controller 150 acquires OCVs of the battery cells 111 and then calculates SOCs using the relation shown in FIG. 3. Subsequently, the assembly battery controller 150 proceeds to step 32 and determines whether balancing control should be started anew on the basis of the latest SOC information acquired this time or the suspended balancing should be resumed using halfway information of the balancing stored in the storage device 127.

When conditions explained below are satisfied in this determination, the assembly battery controller 150 starts balancing control anew on the basis of the SOCs of the battery cells 111 acquired anew.

(1) When the highest SOC among the battery cell SOCs acquired anew is equal to or larger than a predetermined value set in advance.

A value of the highest SOC only has to be determined taking into account an SOC region where deterioration of the battery is promoted and to which degree of an SOC region a user charges a PHEV or an EV. The value only has to be set to, for example, 70% or higher.

This is because, since deterioration of the battery is intense in a high SOC region, when SOCs are present in such a high region, it is preferable to equalize the SOCs of the battery cells and avoid SOC fluctuation. Conversely, even if SOCs are equalized in a low SOC region, the equalization is collapsed when the SOCs change to a high state through charging. Therefore, when the highest SOC is equal to or larger than the predetermined value, balancing is executed on the basis of the latest information. According to this condition, since fluctuation in the high SOC region is detected and the SOCs are balanced, it is possible to satisfactorily suppress battery deterioration. Note that, in order to highly accurately detect SOCs, a condition that a gradient |ΔOCV/ΔSOC| is equal to or larger than a predetermined value may be set using the SOC-OCV characteristic shown in FIG. 3.

(2) When a residual balancing capacity/a total balancing capacity during a start is equal to or smaller than a predetermined value.

A balancing capacity is a product ΔSOC×Qmax of a difference ΔSOC between an SOC of a battery cell and a target SOC and a full charging capacity Qmax of the battery cell. It only has to be determined, taking into account time required until balancing completion of a total balancing capacity, a frequency the user uses the vehicle, fluctuation in a self-discharge characteristic of the battery, fluctuation in a dark current of a circuit to which the battery cells are connected, and the like, what degree of the total balancing capacity should be completed by the last key-off time to start balancing. For example, when 80% of the total balancing capacity is completed, balancing only has to be started anew on the basis of the SOCs acquired in step 31.

This is because, if balancing is continued using information during suspension, it is likely that a change in an environment, a change in a battery characteristic, and an error in balancing accuracy during the continuation of the balancing increase, equalization is not correctly performed, and fluctuation expands. On the basis of this determination standard, when a balancing process is near completion, it is possible to prevent the deterioration in balancing accuracy and the fluctuation expansion by staring balancing anew.

(3) When a predetermined time (a predetermined number of days) elapses from the last balancing start time or when a predetermined number of times of key cycle elapses from balancing start time.

It only has to be determined, taking into account time required until balancing completion of a total balancing capacity, a frequency the user uses the vehicle, fluctuation in a self-discharge characteristic of the battery, fluctuation in a dark current of a circuit to which the battery cells are connected, and the like, what degree of time (number of days) should elapse from the last balancing start time to start balancing. For example, when thirty days elapses from the last balancing start time, balancing only has to be started anew on the basis of the SOCs acquired in step 31.

This is because, if balancing is continued using information during suspension, it is likely that a change in an environment, a change in a battery characteristic, and an error in balancing accuracy during the continuation of the balancing increase, equalization is not correctly performed, and fluctuation expands. On the basis of this determination standard, when the predetermined time (the predetermined number of days) elapses from the last balancing start time or a predetermined key cycle number of times (the predetermined number of days) elapses from the balancing start time, it is possible to prevent the deterioration in balancing accuracy and the fluctuation expansion by staring balancing anew.

(4) When the number of balancing target battery cells of this time calculated anew is larger than a remaining number of balancing target battery cells of the last balancing.

This is for the purpose of avoiding a problem same as the problem in (3). In particular, this is for the purpose of preventing a change in a battery characteristic (a voltage drop of the battery cells due to micro short circuit or the like) and fluctuation expansion due to an error in balancing accuracy. On the basis of this determination, when a change in the battery characteristic occurs, it is possible to prevent the deterioration in balancing accuracy and the fluctuation expansion by starting balancing anew on the basis of the latest information.

(5) When a balancing capacity of this time calculated anew is larger than a remaining balancing capacity stored in the storage device.

This is for the purpose of avoiding a problem same as the problem in (4). On the basis of this determination standard, when a change in the battery characteristic occurs, it is possible to prevent the deterioration in balancing accuracy and the fluctuation expansion by starting balancing anew on the basis of the latest information.

(6) When a maximum value of balancing capacities of the battery cells of this time calculated anew is larger than a maximum value of remaining balancing capacities of the battery cells.

This is for the purpose of avoiding a problem same as the problem in (4). On the basis of this determination standard, when a change in the battery characteristic occurs, it is possible to prevent the deterioration in balancing accuracy and the fluctuation expansion by starting balancing anew on the basis of the latest information.

(7) When temperature fluctuation of this time when SOCs are acquired anew is smaller than temperature fluctuation (a battery temperature and an ambient temperature) during a balancing start.

This is because, since a battery characteristic is different depending on temperature, if temperature fluctuation occurs, it is likely that SOC fluctuation (OCV fluctuation) at that point is not true fluctuation. According to this determination standard, since balancing is stared anew on the basis of battery information in a state in which temperature fluctuation is smaller, it is possible to satisfactorily perform the equalization.

(8) When an average SOC acquired anew is higher than an average SOC during the last balancing start.

This is because, since battery deterioration is intense in a high SOC region, it is desired to equalize voltage fluctuation in the region early. Conversely, even if SOCs are equalized in a low SOC region, the equalization is collapsed when the SOCs changes to a high state through charging. According to this determination standard, since balancing is started anew in a higher SOC region, it is possible to satisfactorily perform the equalization.

(9) When the control means (the battery cell manager 120, the battery cell controller 121, or the assembly battery controller 150) or the battery is replaced.

This is because, when the control means or the battery is replaced, it is likely that the information stored in the storage device 127 is different from an actual state of the battery and fluctuation is expanded. According to this determination standard, even when the control means or the battery is replaced, it is possible to prevent the fluctuation expansion and satisfactorily perform the equalization.

Note that, when a predetermined time does not elapse from the last key-off, the balancing is resumed on the basis of the information stored in the storage device 127. The predetermined time only has to be determined taking into account a polarization characteristic of the battery and fluctuation in the polarization characteristic. The predetermined time is, for example, several minutes to several hours. This is because, when an unattended time is short, a state of the battery is unstable because of the influence of polarization or the like and, if balancing is started anew at this point, it is likely that inaccurate battery fluctuation is detected. According to this standard, it is possible to prevent balancing from being started on the basis of SOCs acquired when a battery state is unstable and prevent the deterioration in balancing accuracy and the fluctuation expansion.

When deviation from the information stored in the storage device 127 is within a range assumed from an individual difference of a battery cell capacity, balancing is not started anew and the balancing is resumed using the halfway information stored in the storage device 127.

Referring back to FIGS. 9 and 10, when the determination in step 32 is NO, i.e., when balancing is started anew on the basis of the information acquired anew in step 31, the assembly battery controller 150 proceeds to step 33 and calculates a discharge end condition according to Formulas (1) and (2) using the SOCs calculated anew. In step 34, the assembly battery controller 150 transmits the calculated discharge end condition to the respective battery cell controller 121.

According to the procedure shown in FIG. 6, in step 21, the battery cell controller 121 receives the transmitted discharge end condition and overwrites and stores the discharge end condition in the storage device 127. Thereafter, as explained above, the battery cell controller 121 subjects the bypass switch 123 to opening and closing control and continues the discharge performed via the bypass resistor 122 until the battery cells 111 satisfy the discharge end condition.

As explained above, according to this embodiment, in the continued and resumed balancing, the new or old battery state information is selected and the balancing is carried out. Therefore, it is possible to suppress worsening of fluctuation due to a change in a battery state, a bypass resistor error, and the like. Further, it is possible to acquire a capacity adjustment condition anew when the battery state changes to a better battery state (high SOC, etc.), it is possible to acquire a capacity adjustment condition anew and perform satisfactory balancing.

Note that the invention is not limited to the embodiment explained above. Various modifications are included in the invention. For example, the embodiment is an embodiment explained in detail in order to plainly explain the invention and is not always limited to an embodiment including all the explained components.

A part or all of the components, the functions, the processing units, the processing means, and the like explained above may be realized as hardware by, for example, being designed by an integrated circuit. The components, the functions, and the like may be realized as software by a processor interpreting and executing programs for realizing the respective functions. The programs for realizing the functions and information such as tables and files can be placed in a storage device such as a memory, a hard disk, or an SSD (Solid State Drive) or a storage medium such as an IC card, an SD card, or a DVD.

REFERENCE SIGNS LIST

100 Electric storage device
110 Assembly battery
111 Battery cells
112 Battery cell groups
120 Battery cell manager
121 Battery cell controller
122 Bypass resistor
123 Bypass switch
124 Voltage detection circuit
125 BSW driving circuit
126 Power supply
127 Storage device
128 Control circuit
129 Signal input/output circuit
130 Current detector
140 Voltage detector
150 Assembly battery controller
160 Signal communication device
170 Insulation element
200 Vehicle controller
400 Inverter
410 Motor generator
420 Charger

The invention claimed is:

1. An electric storage cell control circuit comprising controller including a storage device, the controller performing state monitoring and balancing control for a plurality of electric storage cells connected in series, wherein
the controller stores, in the storage device, information for balancing control calculated on the basis of states of the plurality of electric storage cells and performs the balancing control on the basis of the information stored in the storage device, and
when the balancing control is suspended, the controller stores information during the suspension concerning balancing in the storage device and, in starting the balancing control after the suspension, acquires the latest information concerning states of the plurality of electric storage cells, selects, on the basis of a predetermined condition, whether the balancing control is resumed on the basis of the information during the suspension stored in the storage device or balancing is started anew on the basis of the latest information, and, when the balancing is started anew, stores, in the storage device, information for the balancing control calculated on the basis of the acquired latest information.

2. The electric storage cell control circuit according to claim 1, wherein, in starting the balancing control after the suspension, when the highest state of change (SOC) among acquired SOCs of the electric storage cells is equal to or larger than a predetermined value, the controller selects that balancing is started anew.

3. The electric storage cell control circuit according to claim 1, wherein, in starting the balancing control after the suspension, when a remaining balancing capacity/a total balancing capacity during a start is equal to or smaller than a predetermined value, the controller selects that balancing is started anew.

4. The electric storage cell control circuit according to claim 1, wherein, in starting the balancing control after the suspension, when a predetermined time elapses from the last balancing start time or a predetermined key cycle number of times elapses from a balancing start, the controller selects that balancing is started anew.

5. The electric storage cell control circuit according to claim 1, wherein, in starting the balancing control after the suspension, when a number of balancing target electric storage cells of this time calculated anew is larger than a remaining number of balancing target electric storage cells of last balancing, the controller selects that balancing is started anew.

6. The electric storage cell control circuit according to claim 1, wherein, in starting the balancing control after the suspension, when a balancing capacity calculated anew is larger than a remaining balancing capacity stored in the storage device, the controller selects that balancing is started anew.

7. The electric storage cell control circuit according to claim 1, wherein, in starting the balancing control after the suspension, when a maximum value of balancing capacities of the electric storage cells calculated anew is larger than a maximum value of remaining balancing capacities of the electric storage cells, the controller selects that balancing is started anew.

8. The electric storage cell control circuit according to claim 1, wherein, in starting the balancing control after the suspension, when temperature fluctuation of this time is smaller than temperature fluctuation during a balancing start, the controller selects that balancing is started anew.

9. The electric storage cell control circuit according to claim 1, wherein, in starting the balancing control after the suspension, when an average state of change (SOC) acquired anew is higher than an average SOC during the last balancing start, the controller selects that balancing is started anew.

10. The electric storage cell control circuit according to claim 1, wherein, in starting the balancing control after the suspension, when the electric storage cell or a part or all of the controller is replaced, the controller selects that balancing is started anew.

11. The electric storage cell control circuit according to claim 1, wherein, in starting the balancing control after the suspension, when a predetermined time does not elapse from last key-off, the controller selects that the balancing control is resumed on the basis of the information during the suspension stored in the storage device.

* * * * *